Nov. 4, 1958
A. L. STUCHBERY
2,858,796
MEANS FOR ADJUSTING THE SPACING OF
SHAFTS, ROLLS OR THE LIKE
Filed June 25, 1954
3 Sheets-Sheet 1
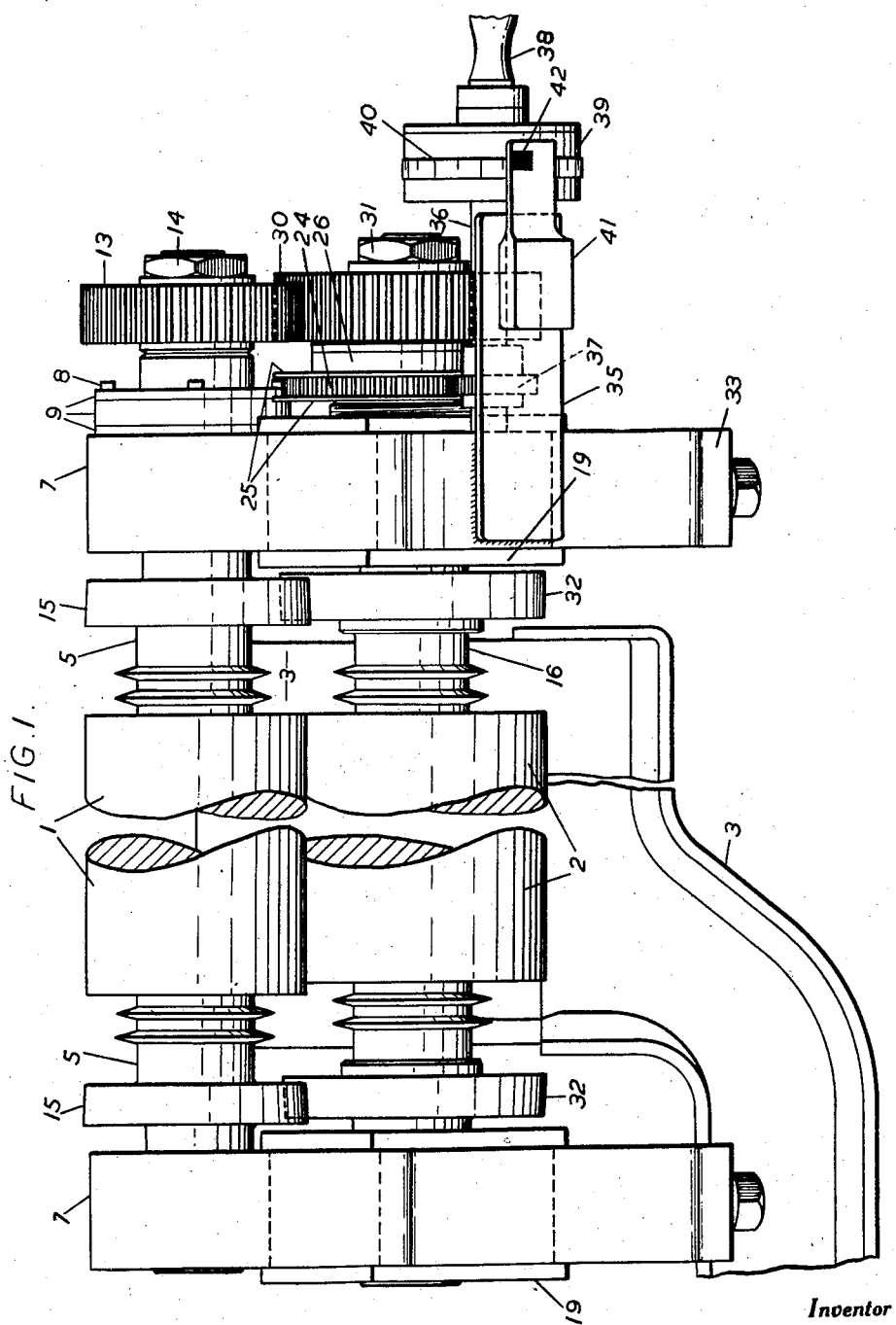
Inventor
Arthur Leslie Stuchbery
By
Mason, Porter, Diller & Stewart
Attorneys

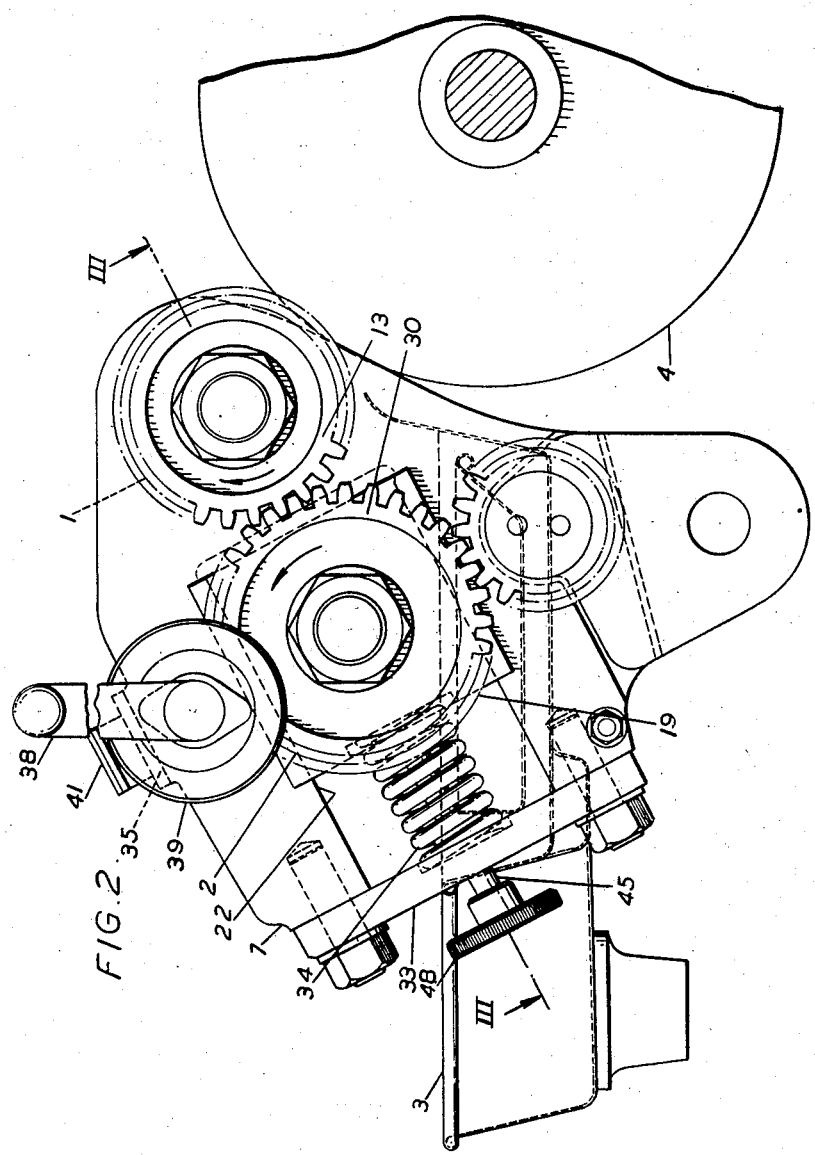

Nov. 4, 1958

A. L. STUCHBERY 2,858,796

MEANS FOR ADJUSTING THE SPACING OF
SHAFTS, ROLLS OR THE LIKE

Filed June 25, 1954

Inventor
Arthur Leslie Stuchbery

By
Mason, Porter, Diller & Stewart
Attorneys

United States Patent Office 2,858,796
Patented Nov. 4, 1958

2,858,796

MEANS FOR ADJUSTING THE SPACING OF SHAFTS, ROLLS OR THE LIKE

Arthur Leslie Stuchbery, Enfield, England, assignor to The Metal Box Company Limited, London, England, a British company Application June 25, 1954, Serial No. 439,303

Claims priority, application Great Britain June 26, 1953

4 Claims. (Cl. 118—262)

This invention relates to means for effecting an adjustment, particularly micro-adjustment of the spacing between a pair of shafts, rolls or the like arranged with their axes in parallel spaced relationship.

There are many mechanisms, for example, printing machines and machines for applying to surfaces coatings of liquids, such as lacquer, varnish or the like in which it is necessary to effect an extremely accurate adjustment of the spacing between two rolls or like members which are arranged parallel to each other, the gap between the opposed surfaces of the rollers determining the amount of the coating which is to be applied. When varying the gap between the said two rolls it is essential to ensure that the axes of the rolls shall remain truly parallel, and that the adjustment be accurately determined.

It is a main object of the invention to provide, in or for machines of the kind indicated above, means for effecting accurate and speedy micro-adjustment of the space between a pair of shafts, rolls or the like, arranged with their axes in parallel spaced relationship, and further, to provide means whereby such micro-adjustment may be carried out from one end only of said shafts, and without the necessity for making any subsequent check and adjustment at the other end of the shafts, to ensure that the shafts are truly parallel in their new position of adjustment.

According to the invention there is provided a means for effecting micro-adjustment of the spacing between a pair of shafts or the like arranged with their axes in parallel spaced relationship, wherein the said shafts are each carried at their ends in bearings arranged to permit movement of one shaft relative to the other at right angles to the axis thereof, and axial movement of one shaft relative to the other, one of said shafts having at or near each end thereof a co-axial conical surface and the other shaft having at or near each end thereof a co-axial conical surface of similar but oppositely directed conicity, said shafts being resiliently urged towards each other so as to effect contact between the conical surfaces on one shaft and the oppositely directed conical surfaces on the other, and means being provided at the end of one of said shafts for effecting axial movement thereof relative to the other shaft so as to vary the interval between said parallel shafts by the relative axial displacement of said contacting conical surfaces.

In order that the invention may be better understood, reference will now be made to the accompanying drawings which illustrate by way of example a preferred embodiment as applied to the adjustment of the fountain rolls of a precision coating machine in which the space between two co-operating rolls maintained in parallel spaced relationship determines the thickness of a coating of lacquer or the like to be applied to a sheet of thin metal.

In the drawings:

Fig. 1 is a plan of each end of the fountain rolls and the associated adjustment mechanism therefor, Fig. 2 is an end elevation seen from the right of Fig. 1, and showing the disposition of an impression roller in relation thereto.

In a machine of this kind the two said fountain rolls may be (but are not necessarily) of different diameters and will be referred to herein for the sake of convenience as the small fountain roll and the large fountain roll respectively.

The small roll 1 is the transfer roll and the large fountain roll 2 is the feed roll, the feed roll 2 running in a trough 3 of liquid such as lacquer which is maintained at a constant level in the trough so that lacquer is uniformly taken up along the surface of the roll 2. The feed roll 2 transfers the film of lacquer thereon to the transfer roll 1 and the gap between the two rolls will determine the thickness of the film of lacquer on the transfer roll 1, this film then being transferred in turn to another roll 4 which is one of an assembly between which sheets of thin metal are fed in order to receive a coating of the lacquer or other material which it is desired to apply (Figs. 1 and 2).

The mechanism to be described is (with the exceptions hereinafter mentioned) provided at each end of the pair of rolls and it will therefore be convenient to refer, except where otherwise stated, to the arrangement at each end of the pair of rolls.

Figure 3:
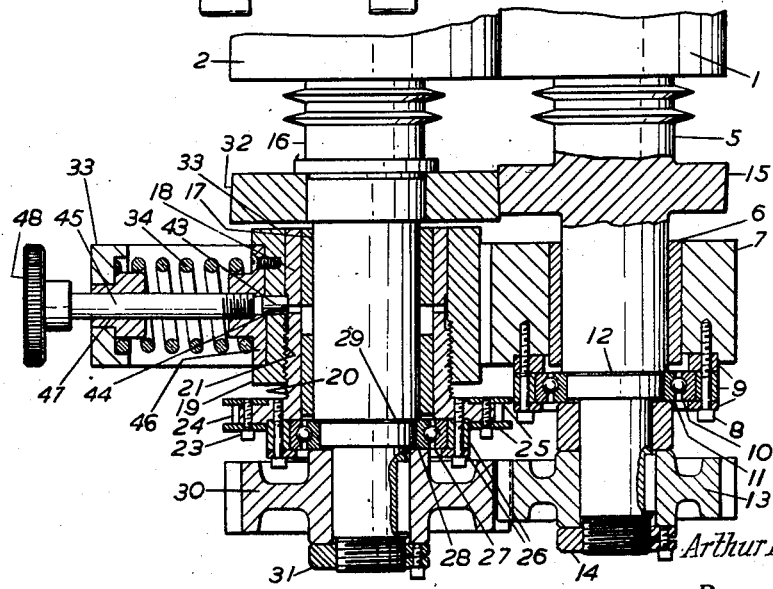
Fig. 3 is a section on the line III—III of Fig. 2.

The small fountain roll 1 has, extending from each end thereof as shown in Fig. 3 an integral co-axial end shaft 5 each said end shaft being carried in a plain bearing 6 in a bracket 7 mounted on the frame (not shown) of the machine. Secured to the right hand bracket 7 by means of screws 8 and locating rings 9 (Fig. 3) is the outer race 10 of a ball bearing the inner race 11 of which is secured on a stepped portion 12 of the said end shafts 5 at the right hand end of the roll 1 so as to secure the roll against axial movement. At the right hand extremity of roll 1 the end shaft 5 has keyed thereto a pinion 13 secured against axial movement thereon by a lock nut 14. Pinion 13 engages with a further pinion mounted on the large fountain roll 2, as will be described hereafter. Between each end of the small fountain roll 1 and its bearings 6 the said end shaft 5 is formed with an integral co-axial conically tapering ring member 15.

The large fountain roll 2 is formed at each end with an end shaft 16 carried in plain bearings 17 mounted in a metal bush 18 arranged within a bearing block 19. At the right hand end of the large roll 2 the bush 18, at the end thereof remote from the roll, is externally threaded at 20 and engages with a corresponding internal thread 21 formed within the outer end of the bearing block 19 at the said end of the large roll 2. Each bearing block 19 is mounted in parallel guides 22 (Fig. 2) formed on each side bracket and can move in said guides 22 to move the axis of the large roll 2 towards or away from the axis of the small roll 1 along a straight line extending through their axes.

The threaded bush 18 is formed at its outer end with a radially extending flange 23 (Fig. 3) formed at its periphery with gear teeth so as to constitute an integral gear wheel 24. Shroud rings 25 are bolted to either side of the flange 23. Secured to the end face of said flange 23 by locating rings 26 screwed thereto is the outer race 27 of a ball bearing the inner race 28 of which is secured on said end shaft 16 with the side face of the race 28 abutting a stepped portion 29 of said end shaft 16. At its outermost end the end shaft 16 has keyed thereto and secured against axial movement thereon a pinion 30 which meshes with the aforesaid pinion 13 provided on the end shaft 5 of the small fountain roll 1, so as to provide for rotation of the small and the large fountain roll in opposite directions. Pinion 30 abuts the inner race 28 of the ball bearing and is secured on shaft 16 by a locknut 31, thereby securing bush 18 against axial movement relative to shaft 16.

Between each end of the large fountain roll 2 and its bearing each said end shaft has secured thereon e. g. by shrinking, a conical ring member 32 of similar but oppositely directed conicity to the ring member 15 provided on the small fountain roll 1. Secured on each said bracket 7 is a bridge plate 33 between which and one end of the bearing block 19 mounted therein is located a helical spring 34 the pressure of which on said bearing block 19 urges the large roll 2 towards the small roll 1 so as to effect contact between the oppositely tapering ring members 15, 32 at the ends of the rolls 1, 2 respectively.

Figure 4:
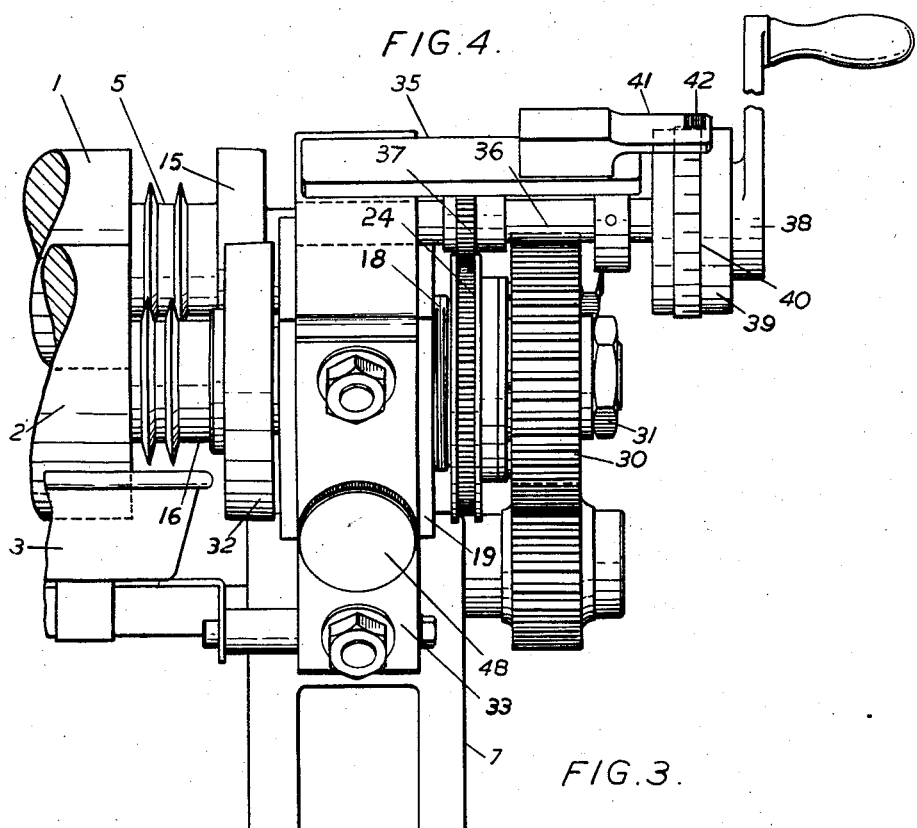
Fig. 4 is a front elevation of the right hand end of the fountain rolls shown in Fig. 1.

Secured on the right hand bracket 7 is a control bracket 35 on which and in bracket 7 there is journalled for rotation and axial movement a shaft 36 having secured thereon a further gear wheel 37 which meshes with the gear wheel 24 integral with the flanged end 23 of the threaded bush 18 of the large fountain roll 2 (Figs. 1 and 4). The rotatable shaft 36 is adapted to be turned by means of a handle 38 at the end thereof. The tooth ratios of the said gear wheels 37, 24 are such that one rotation of said handle 38 will produce only fractional rotation of the gear 24 on the threaded bush 18. Means are also provided for indicating the number of revolutions of the handle 38 which have been made from a given position of engagement of the said two pinions 37 and 24.

As shown in Figs. 1 and 4 the gear wheel 24 integral with the threaded bush 18 of the large roll 2 is provided with shroud rings 25 which extend radially beyond the teeth of the gear wheel and thus entrain for axial movement therewith the gear wheel 37 and the axially movable shaft 36 carried by the control bracket 35, the shaft 36 and gear 37 thereby moving axially with the threaded bush 18 upon rotation of the handle 38 on said shaft 36. The shaft 36 is conveniently provided with a co-axial barrel 39 which has a peripheral index line 40, marked with sub-divisions thereon, inscribed on its surface as shown in Figs. 1 and 4. The control bracket 35 has secured thereto an indicator pointer 41 on which is marked a graduated scale as at 42 which extends transversely of the index line 40 on the barrel 39. The scale 42 and index line 40 may be marked to give a reading showing the gap between the large and small rolls 2 and 1 for a given number of turns or fractions of a turn of the handle 38.

The threaded bush 18 is formed with a fine pitch thread so that one rotation of the gear wheel 24 integral with the threaded bush 18 will effect a very small axial movement of the threaded bush 18 and, accordingly, of the shaft on which it is secured.

The other end of the small roll 1 is carried in a bearing similar to the bearing 6 and is also formed into a conically tapering ring member similar to ring member 15, Fig. 1. The other end of the large roll 2 is provided with a ring member similar to ring member 32 and is journalled in a plain bearing in a bearing block 19 similar to the block at the right hand end.

To enable the roll 2 to be locked in its adjusted position the bush 18 may be secured against rotation by means of a locking plug 43 which can be pressed into locking engagement with a peripherally grooved portion 44 of the bush 18 by means of a threaded spindle 45 which engages in a flanged nut 46 secured to the bearing block 19 and extending through a bush 47 mounted in the bridge plate 33 within spring 34 (Figs. 2 and 3). The spindle 45 may be rotated by knob 48 to press the plug 43 into the groove 44 or to release the plug 43 from locking engagement therewith.

In operation, when it is desired to vary the gap between the small and the large fountain rolls 1 and 2 the said handle 38 is turned thereby imparting through gears 37 and 24 a degree of rotation to the threaded bush 18 which is threaded into the internally threaded end 21 of the said bearing block 19. Such rotation will cause the threaded bush 18 to be moved axially in one direction or the other within said bearing block 19, and similar axial movement will thereby be imparted to the large fountain roll 2 axially secured to said bush. The pinion 30 moves axially with the large roll 2 relatively to pinion 13, and pinion 30 is therefore made wider than pinion 13 so that the teeth of the latter are fully engaged despite such axial movement of pinion 30, (Figs. 1 and 3). Since the conical ring members 32 on the large fountain roll are resiliently held in engagement with the other ring members 15 on the small fountain roll by springs 34 the axial movement of the large fountain roll 2 relative to the small fountain roll 1, and the consequent relative axial movement between the oppositely tapering faces of the two pairs of ring members 15 and 32 will cause the large fountain roll 2 to be moved towards or away from the small fountain roll 1, depending upon the direction of rotation of the said handle 38 and the gears 37, 24 associated therewith, the bearing blocks 19 in which the large fountain roll 2 is mounted sliding in their parallel guides 22. In this manner a high degree of accuracy can be obtained in carrying out very small adjustments of the gap between the large and small fountain rolls whilst ensuring that they are maintained in true parallel spaced relationship.

I claim:

1. In apparatus of the character described, a pair of shafts arranged with their axes in parallel spaced relation, bearing means supporting the shafts for relative movement at right angles to a shaft axis and along a shaft axis, one of said shafts having near each end thereof a co-axial conically tapering surface and the other shaft having near each end thereof a co-axial conically tapering surface of similar but oppositely directed conicity, means resiliently urging said shafts toward each other so as to effect contact between the conically tapering surfaces on one shaft and the oppositely directed conically tapering surfaces on the other shaft, one end of one of said shafts being journalled in a bush, said bush being externally threaded, an internally threaded block in which the bush is threadedly mounted, said bearing means including means supporting the block for movement at right angles to the bush journal axis, means for causing the bush journalled shaft to partake of axial movement with the bush, the threads on said bush being formed with a fine pitch, means for imparting rotation to the bush, and means for locking one of said shafts against further axial movement relative to the other shaft after adjustment to provide a predetermined spacing between said shafts, said locking means including plug means engageable with said bush, and spindle means interconnected with said plug means and rotatable to press the latter into locking engagement with said bush.

2. In apparatus of the character described, a pair of shafts arranged with their axes in parallel spaced relation, bearing means supporting the shafts for relative movement at right angles to a shaft axis and along a shaft axis, one of said shafts having near each end thereof a co-axial conically tapering surface and the other shaft having near each end thereof a co-axial conically tapering surface of similar but oppositely directed conicity, means resiliently urging said shafts toward each other so as to effect contact between the conically tapering surfaces on one shaft and the oppositely directed conically tapering surfaces on the other shaft, one end of one of said shafts being journalled in a bush, said bush being externally threaded, an internally threaded block in which the bush is threadedly mounted, said bearing means including means supporting the block for movement at right angles to the bush journal axis, means for causing the bush journalled shaft to partake of axial movement with the bush, the threads on said bush being formed with a fine pitch, means for imparting rotation to the bush, gears on the ends of said shafts for rotating said shafts, gear means for imparting rotation to the shaft gear means, large spur gear means formed on said bush, small spur means enmeshed with said large spur gear means for imparting rotation in one direction or the other to said bush, and means for manually rotating said small spur gear means to thereby bring about rotation of the bush and relative axial movement between the shafts.

3. In apparatus of the character described, a pair of shafts arranged with their axes in parallel spaced relation, bearing means supporting the shafts for relative movement at right angles to a shaft axis and along a shaft axis, one of said shafts having near each end thereof a co-axial conically tapering surface and the other shaft having near each end thereof a co-axial conically tapering surface of similar but oppositely directed conicity, means resiliently urging said shafts toward each other so as to effect contact between the conically tapering surfaces on one shaft and the oppositely directed conically tapering surfaces on the other shaft, one end of one of said shafts being journalled in a bush, said bush being externally threaded, an internally threaded block in which the bush is threadedly mounted, said bearing means including means supporting the block for movement at right angles to the bush journal axis, means for causing the bush journalled shaft to partake of axial movement with the bush, the threads on said bush being formed with a fine pitch, means for imparting rotation to the bush, gears on the ends of said shafts for rotating said shafts, gear means for imparting rotation to the shaft gear means, large spur gear means formed on said bush, small spur means enmeshed with said large spur gear means for imparting rotation in one direction or the other, means for manually rotating said small spur gear means to thereby bring about rotation of the bush and relative axial movement between the shafts, said last named rotation imparting means comprising a shaft on which the small spur gear means is carried and which is slidably mounted with its axis parallel the axes of the first mentioned pair of shafts, means for causing the slidably mounted shaft and the enmeshed small and large spur gear means to move together as the relative axial movement between said first mentioned pair of shafts is brought about, and indicating dial means movable with the small spur gear means carrying shaft and rotatable relative to a fixedly mounted indicator pointer for indicating the degree of rotation of the intermeshing spur gear means and bush and the resulting relative axial movement brought about between said first mentioned pair of shafts.

4. In apparatus of the character described, a pair of shafts arranged with their axes in parallel spaced relation, bearing means supporting the shafts for relative movement at right angles to a shaft axis and along a shaft axis, one of said shafts having near each end thereof a co-axial conically tapering surface and the other shaft having near each end thereof a co-axial conically tapering surface of similar but oppositely directed conicity, means resiliently urging said shafts toward each other so as to effect contact between the conically tapering surfaces on one shaft and the oppositely directed conically tapering surfaces on the other shaft, one end of one of said shafts being journalled in a bush, said bush being externally threaded, an internally threaded block in which the bush is threadedly mounted, said bearing means including means supporting the block for movement at right angles to the bush journal axis, means positioned between said bush and the bush mounted shaft for mechanically interconnecting the bush and the bush journalled shaft for axial movement together in both directions along the shaft axis and for relative rotation of the bush about the bush journalled shaft, the threads on said bush being formed with a fine pitch, and means for imparting rotation to the bush.

References Cited in the file of this patent

UNITED STATES PATENTS

| | | |
|---|---|---|
| 844,128 | Heys | Feb. 12, 1907 |
| 1,347,066 | Vuono | July 20, 1920 |
| 2,028,786 | Lamatsch | Jan. 28, 1936 |
| 2,503,858 | Waterworth | Apr. 11, 1950 |